(12) United States Patent
Farnsworth

(10) Patent No.: US 10,362,873 B1
(45) Date of Patent: Jul. 30, 2019

(54) CHILD SAFETY ANTI-TIPOVER PROTECTION DEVICE

(71) Applicant: Todd A. Farnsworth, East Syracuse, NY (US)

(72) Inventor: Todd A. Farnsworth, East Syracuse, NY (US)

( * ) Notice: Subject to any disclaimer, the term of this patent is extended or adjusted under 35 U.S.C. 154(b) by 0 days.

(21) Appl. No.: 15/954,729

(22) Filed: Apr. 17, 2018

(51) Int. Cl.
*A47B 97/00* (2006.01)
*F16B 1/00* (2006.01)

(52) U.S. Cl.
CPC ............... *A47B 97/00* (2013.01); *F16B 1/00* (2013.01); *A47B 2097/008* (2013.01); *F16B 2001/0028* (2013.01)

(58) Field of Classification Search
CPC ............................................... A47B 2097/008
See application file for complete search history.

(56) References Cited

U.S. PATENT DOCUMENTS

| 4,762,258 | A | * | 8/1988 | Murphy | ................... | B60R 7/08 |
| | | | | | | 108/44 |
| 4,967,993 | A | * | 11/1990 | Wilson | ..................... | B44D 7/00 |
| | | | | | | 206/806 |
| 5,516,067 | A | * | 5/1996 | Schiele | .................. | A47B 96/06 |
| | | | | | | 248/202.1 |
| 7,896,305 | B2 | * | 3/2011 | Lowenstein, Jr. | ..... | A47B 97/00 |
| | | | | | | 248/500 |
| 2005/0051697 | A1 | * | 3/2005 | Lowenstein, Jr. | ..... | A47B 97/00 |
| | | | | | | 248/680 |

* cited by examiner

*Primary Examiner* — Amy J. Sterling
(74) *Attorney, Agent, or Firm* — Bond Schoeneck & King, PLLC; George R. Mcguire

(57) ABSTRACT

A child safety anti-tipover protection device, including (i) a first bracket extending between first and second ends and having first and second sides, (ii) a second bracket hingedly connected to the first surface of the first bracket at an intermediate position between the first and second ends, and having first and second sides, (iii) a first strip of fastener material disposed on the second surface of the first bracket, the first strip of fastener material extending between the first and second ends and crossing the intermediate position; and (iv) a second strip of fastener material disposed on the first surface of the second bracket.

2 Claims, 7 Drawing Sheets

CHILD SAFETY ANTI-TIPOVER PROTECTION DEVICE

FIELD OF THE INVENTION

The present disclosure is directed generally to devices used to help prevent furniture and appliances from accidentally tipping over on a child, and more particularly to such devices that can be readily removed from the furniture/appliance so that it may be moved/rearranged.

BACKGROUND

Heavy articles that are susceptible to tipping over when pulled with minimal forces can cause serious injury or death to a small child. Thus, safety devices to assist in prevention of toddlers and others accidentally tipping over furniture, televisions, and the like are generally known. Most commonly, the article is anchored to a wall via a fastener, such as a screw that is effective but causes damage to the wall and the article. Moreover, if rearranging the article in the room is desired, use of such a safety measure is difficult. An example of such a device can be seen in U.S. Pat. No. 5,076,525 and U.S. Publication No. US2013/0087675.

Another solution is to use a piece of releasable fastener, such as VELCRO® that has one part of it adhesively secured to a wall and the other part of it adhesively secured to the rear of the article. While the damage is minimized compared to use of screws, a single strip of fastener on the rear of the article may not be entirely effective at preventing the accidental tipping of the article. An example of such a device can be seen in International Published Application WO2009/027,365.

Accordingly, there is a need in the art for a safety device that prevents the tipping over of an article that minimizes damage to the wall and article while permitting ease of rearrangement of the article in the room.

SUMMARY

The present disclosure is directed to a child safety anti-tipover protection device.

According to an aspect is a child safety anti-tipover protection device, comprising (i) a first bracket extending between first and second ends and having first and second sides, (ii) a second bracket hingedly connected to the first surface of the first bracket at an intermediate position between the first and second ends, and having first and second sides, (iii) a first strip of fastener material disposed on the second surface of the first bracket, the first strip of fastener material extending between the first and second ends and crossing the intermediate position; and (iv) a second strip of fastener material disposed on the first surface of the second bracket.

According to an embodiment, a universal hinge can be used that permits the second bracket to move about a first hinge axis and a second hinge axis relative to the first bracket.

These and other aspects of the invention will be apparent from the embodiments described below.

BRIEF DESCRIPTION OF THE DRAWINGS

The present invention will be more fully understood and appreciated by reading the following Detailed Description in conjunction with the accompanying drawings, in which.

DETAILED DESCRIPTION OF EMBODIMENTS

Figure 1:
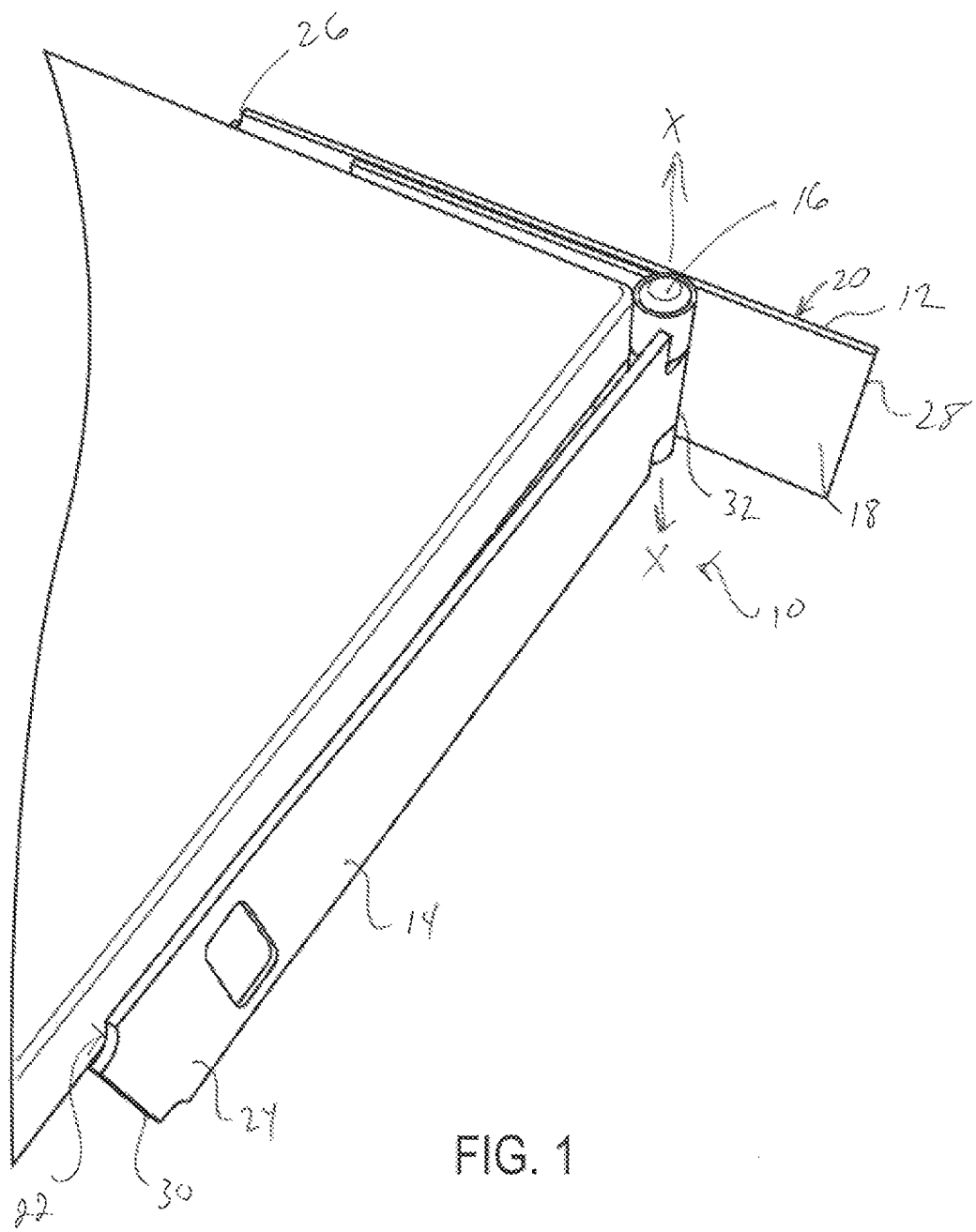
FIG. 1 is a frontal perspective view of a child safety anti-tipover device shown in use, in accordance with an embodiment.
Figure 2:
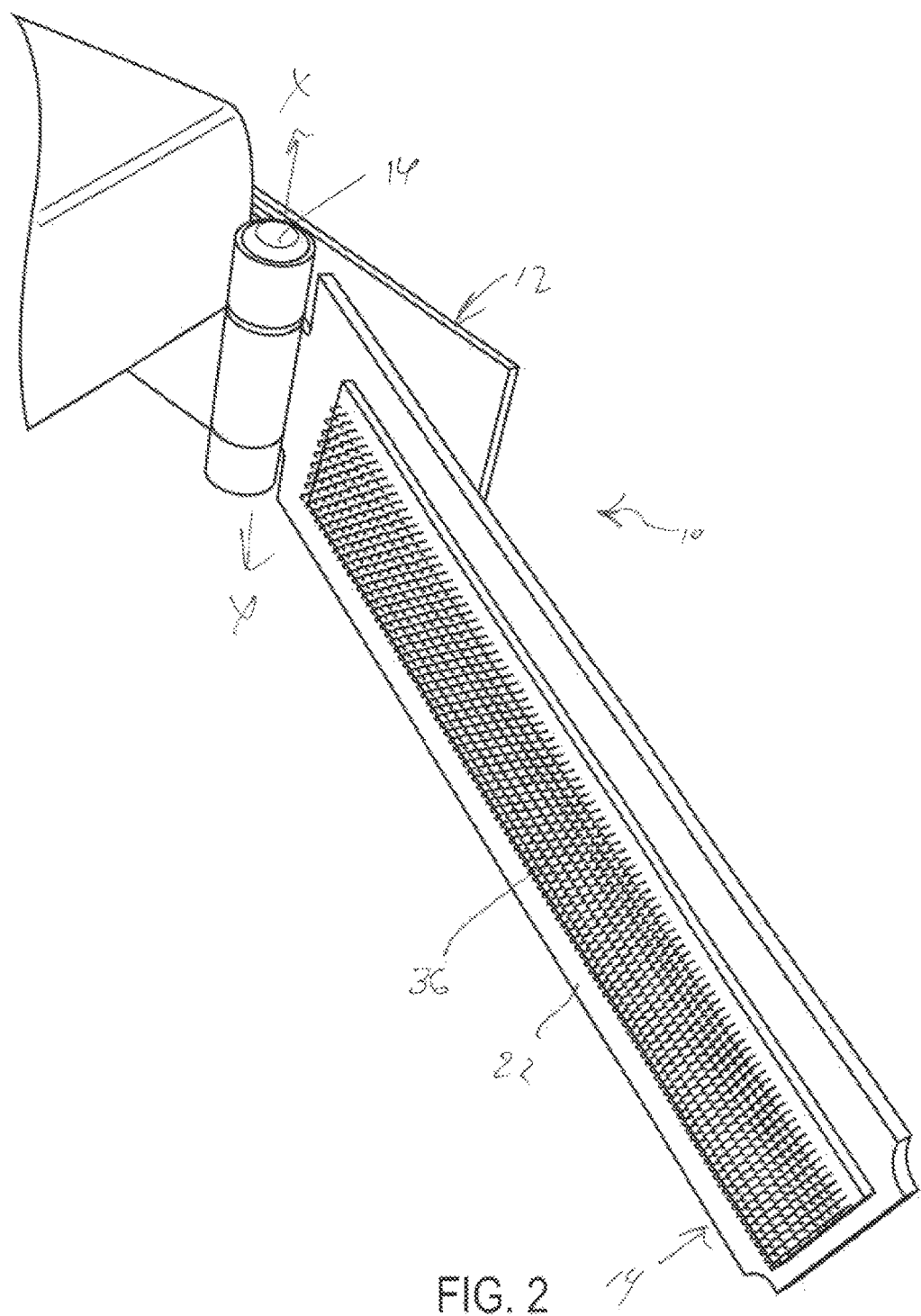
FIG. 2 is a perspective view of a hinged bracket of a child safety anti-tipover device, in accordance with an embodiment.

The present disclosure describes a child safety anti-tipover protection device, designated generally by reference numeral 10.

Referring to FIG. 1, in one embodiment, is device 10 shown as comprising a first bracket 12 to which a second bracket 14 is connected via a hinge 16 such that bracket 14 can pivotally move about hinge axis X-X relative to bracket 12. Brackets 12, 14 each include first and second surfaces 18, 20 and 22, 24, respectively, and extend between first and second ends 26, 28 and 30, 32, respectively. Hinge 16 is mounted on first surface 18 of bracket 12. A strip of fastener material 34, 36, is adhered/attached to the second surface 20 of bracket 12 and the first surface 22 of bracket 14. Fastener material 34, 36 can be any type of known or future developed fastener material, such as VELCRO®, hook and loop, Dual-Lock™ fastener from 3-M, and the like.

Figure 3:
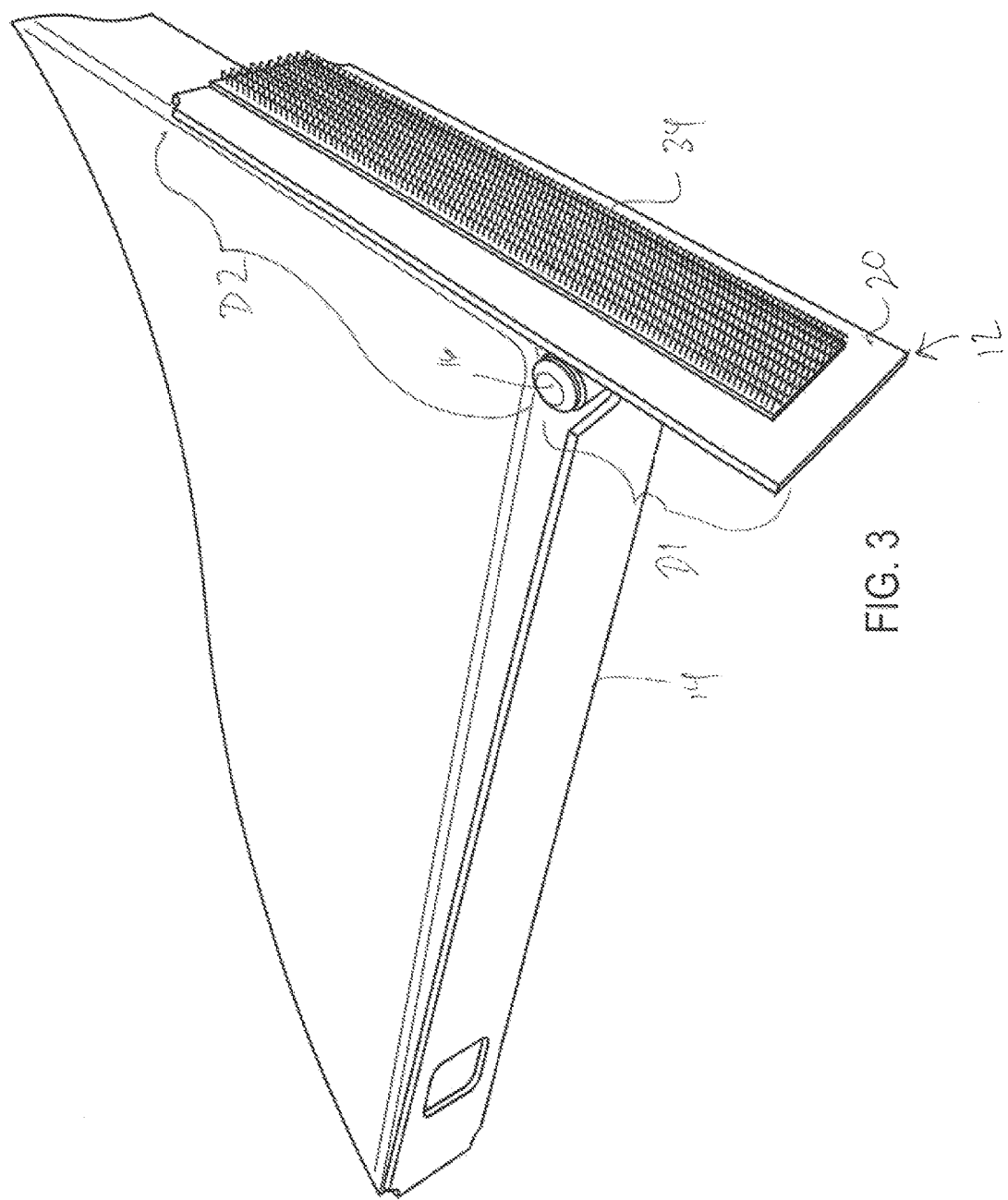
FIG. 3 is a rear perspective view of a child safety anti-tipover device shown in use, in accordance with an embodiment.
Figure 4:
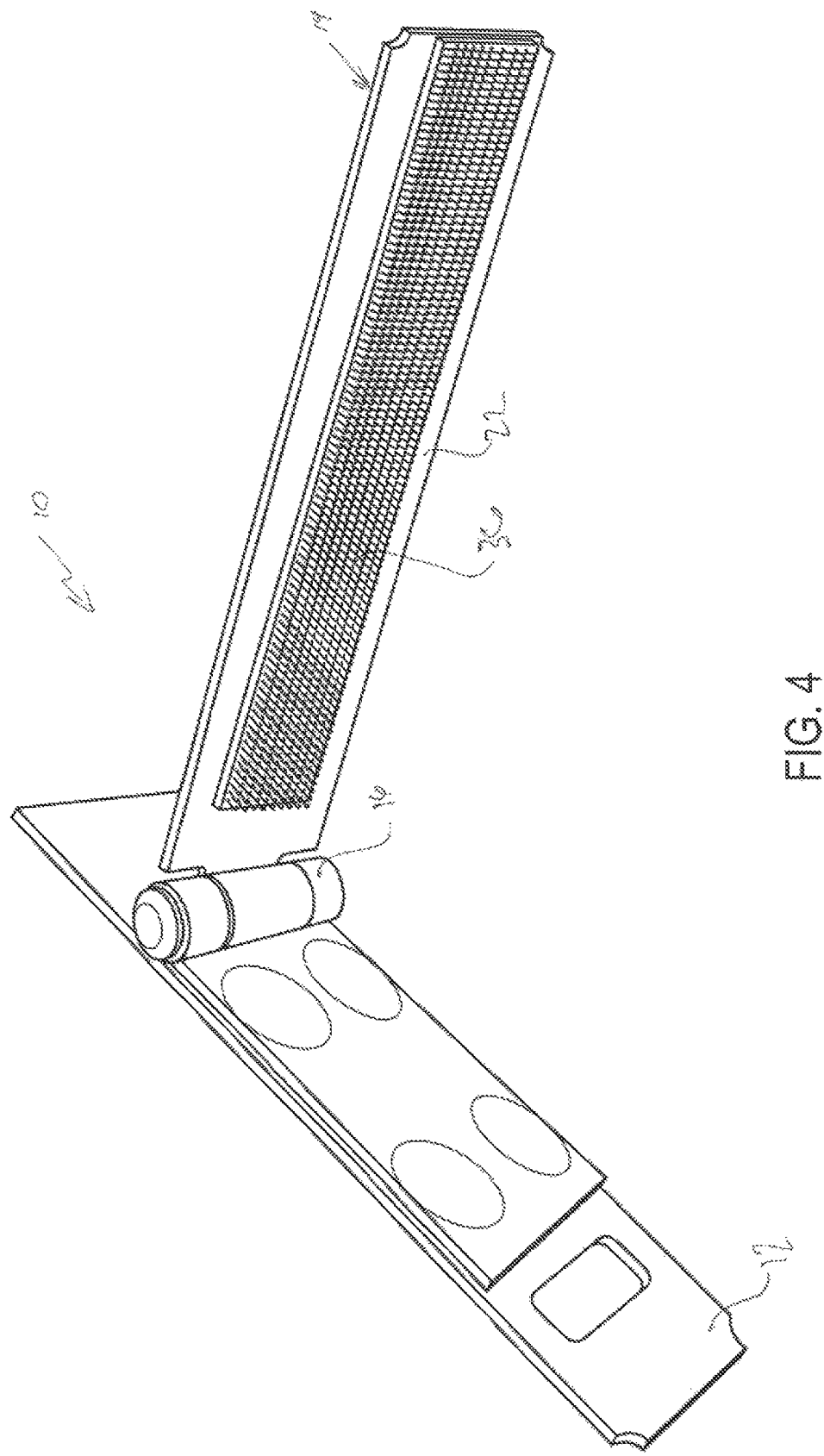
FIG. 4 is a frontal perspective view of a child safety anti-tipover device, in accordance with an embodiment.
Figure 5:
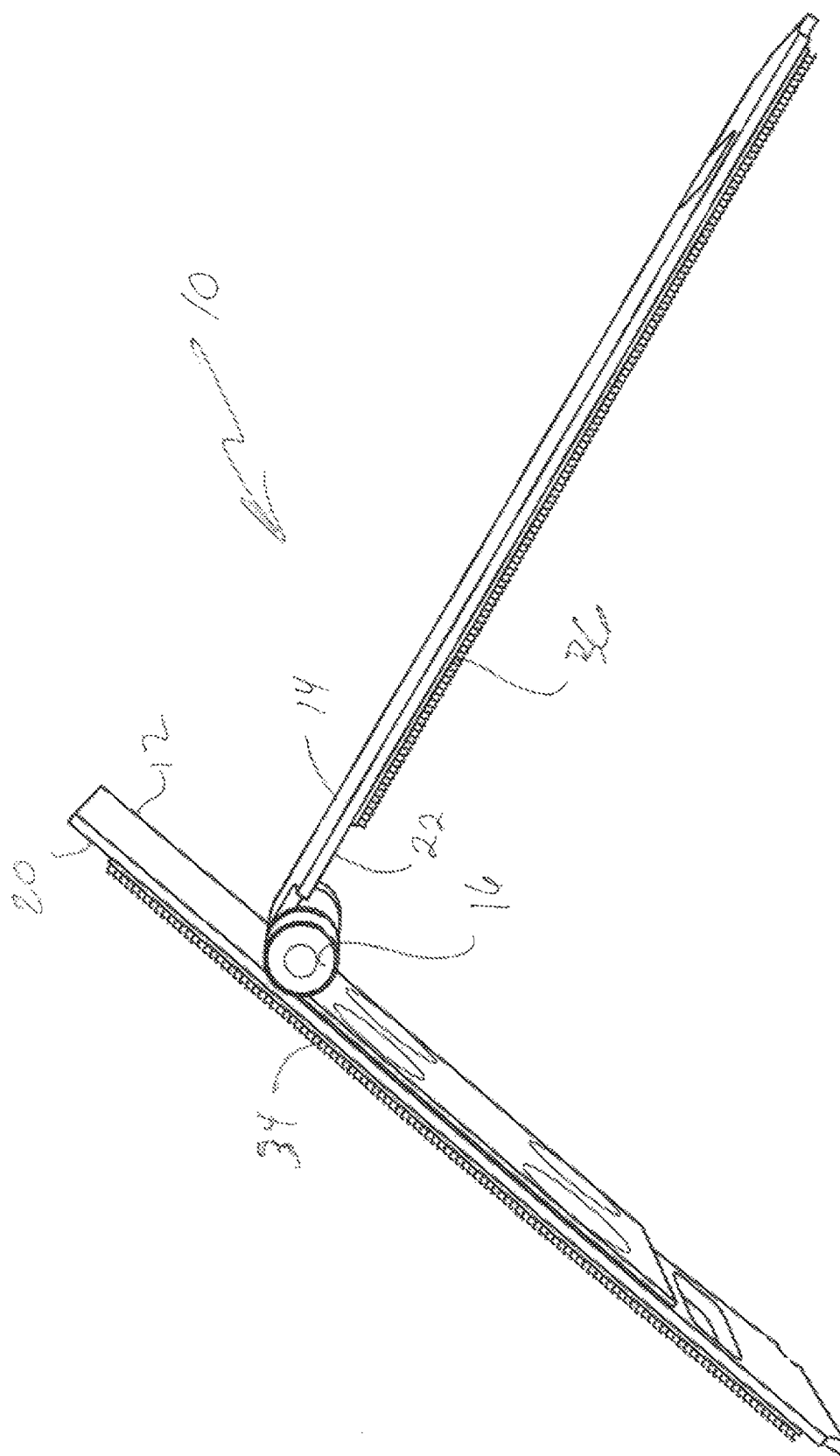
FIG. 5 is a top perspective view of a child safety anti-tipover device, in accordance with an embodiment.
Figure 6:
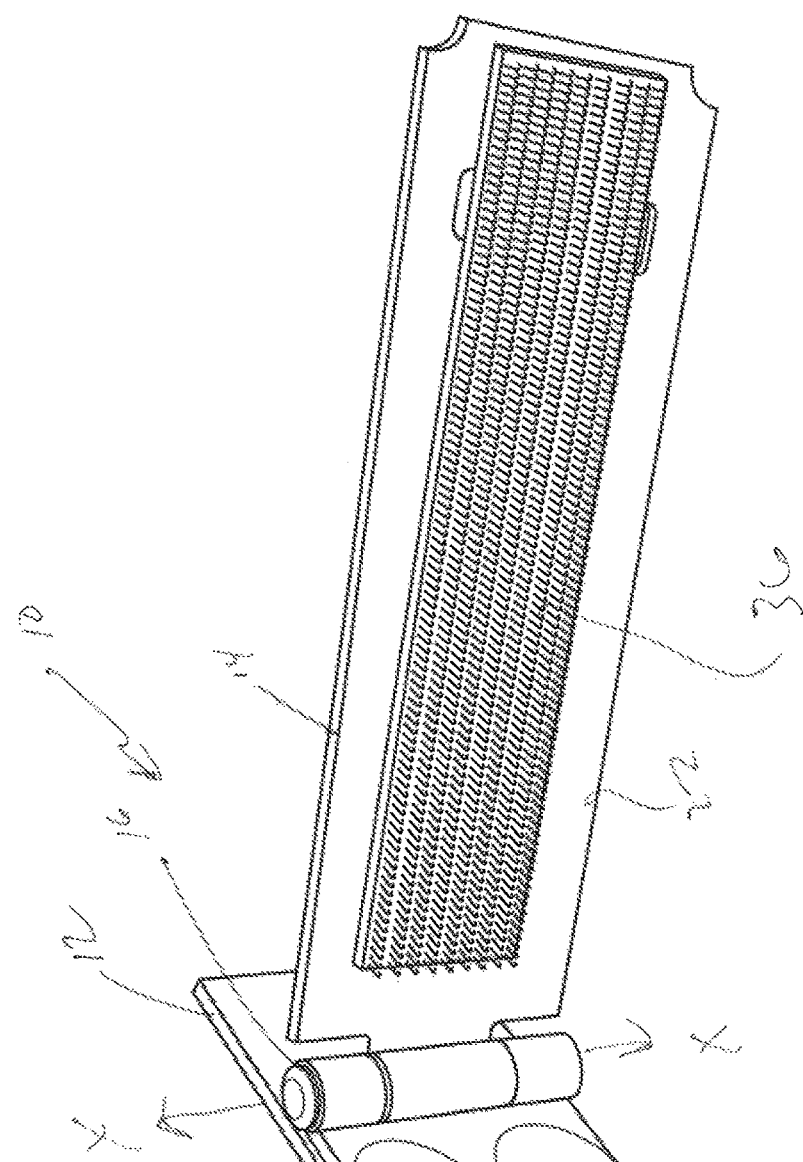
FIG. 6 is a frontal perspective view of a child safety anti-tipover device, in accordance with an embodiment.

Hinge 16 is positioned at an intermediate position along the length of bracket 12 between ends 26 and 28. Fastener material 34 that is attached to second surface 20 of bracket 12 extends between ends 26 and 28 and crosses the intermediate position where hinge 16 is located. By having a length of fastener material that extends beyond the hinge connection point of bracket 14, it increases the force that would need to be applied to disconnect the device 10 from a wall; if the fastener was terminated at a position coincident with the hinge position, a slight force may cause the ends of the fastener to become undone starting the process of the entire fastener to become undone. Instead, by moving the ends of the fastener material 34 beyond in both directions from the hinge's position, more force is required to begin the process of undoing the connection created by the fastener strip. In FIG. 1, the distances D1 and D2 (see FIG. 3) are representative of the distances from the hinge's position that the fastener material 34 extends towards ends 26 and 28, respectively. Furthermore, fastener strips 34, 36 include either an adhesive, outwardly facing surface that permit them to be adhered to a wall and/or furniture/appliance, or cooperate with a strip of corresponding fastener material that can be adhered to a wall and furniture/applicant.

Figure 7:
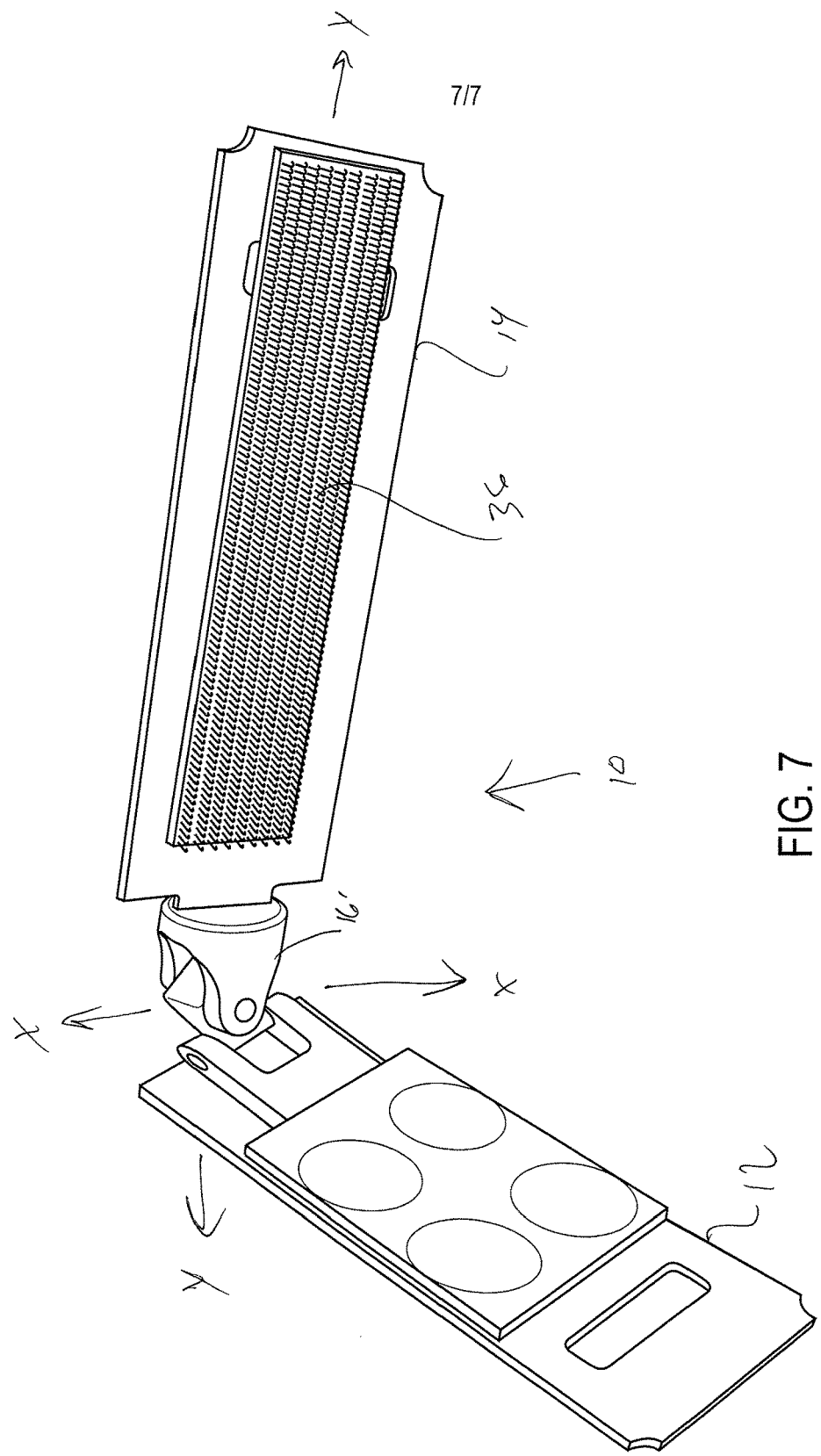
FIG. 7 is a frontal perspective view of a child safety anti-tipover device, in accordance with an alternate embodiment.

With regard to FIG. 7, as an alternate to a straight hinge 16, a universal hinge 16' could be substituted that would permit second bracket 14 to rotate about its longitudinal axis Y-Y as well as about axis X-X. This would be useful when anchoring furniture having a flanged edge.

While various embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific embodiments described herein. It is, therefore, to be understood that the foregoing embodiments are presented by way of example only and that, within the scope of the appended claims and equivalents thereto, embodiments may be practiced otherwise than as specifically described and claimed. Embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

The above-described embodiments of the described subject matter can be implemented in any of numerous ways. For example, some embodiments may be implemented using hardware, software or a combination thereof. When any aspect of an embodiment is implemented at least in part in software, the software code can be executed on any suitable processor or collection of processors, whether provided in a single device or computer or distributed among multiple devices/computers.

What is claimed is:

1. A child safety anti-tipover protection device, comprising:
   a. a first bracket extending between first and second ends and having first and second sides;
   b. a second bracket hingedly connected to said first side of said first bracket at an intermediate position between said first and second ends, and having first and second sides;
   c. a first strip of fastener material disposed on said second side of said first bracket, said first strip of fastener material extending between said first and second ends and crossing said intermediate position; and
   d. a second strip of fastener material disposed on said first surface of said second bracket;
   e. wherein said second bracket rotates around a fixed axis;
   f. wherein said fixed axis is parallel to said first side of said first bracket.

2. The child safety anti-tipover protection device according to claim 1, wherein said second bracket is movable about a first hinge axis and a second hinge axis relative to said first bracket.

* * * * *